Nov. 6, 1923.

E. SCHNEIDER 1,472,941

ADJUSTABLE ACTION FUSE FOR PROJECTILES

Filed Jan. 4, 1922    6 Sheets-Sheet 1

Inventor:-
Eugene Schneider
By Mauro, Cameron, Lewis & Kerkam
Attorneys

Nov. 6, 1923. 1,472,941
E. SCHNEIDER
ADJUSTABLE ACTION FUSE FOR PROJECTILES
Filed Jan. 4, 1922 6 Sheets-Sheet 2
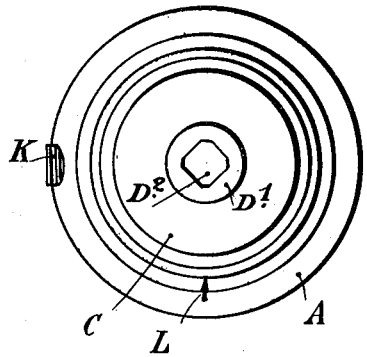
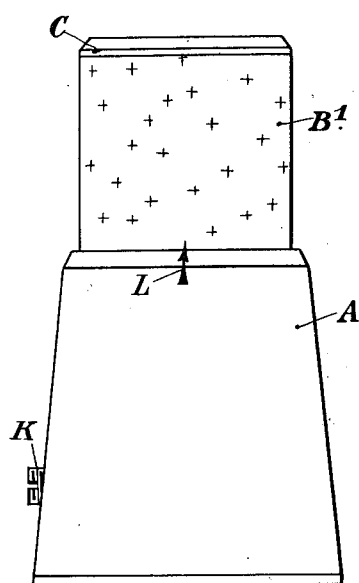
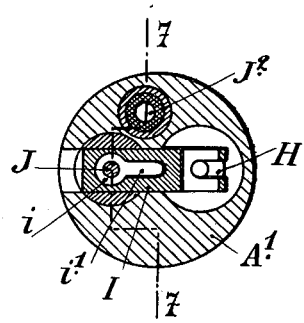
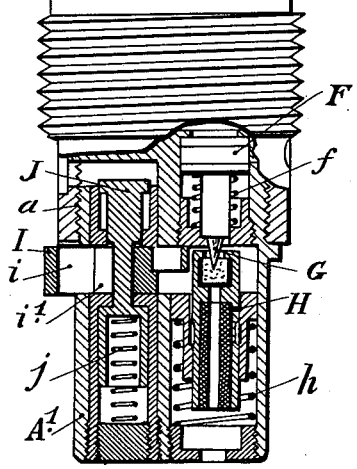
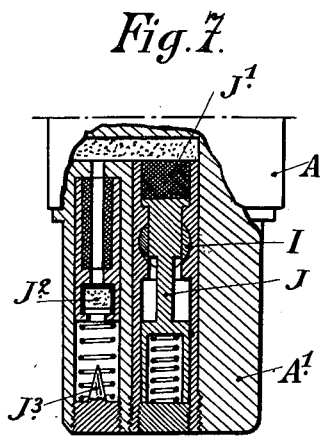
Inventor
Eugene Schneider
By Mauro, Cameron, Lewis & Perkey
Attorneys Nov. 6, 1923.  1,472,941
E. SCHNEIDER
ADJUSTABLE ACTION FUSE FOR PROJECTILES
Filed Jan. 4, 1922    6 Sheets-Sheet 4

Inventor
Eugene Schneider
By Mauro, Cameron, Lewis & Kerkam
Attorneys

Nov. 6, 1923.  1,472,941
E. SCHNEIDER
ADJUSTABLE ACTION FUSE FOR PROJECTILES
Filed Jan. 4, 1922  6 Sheets-Sheet 5

Inventor:-
Eugene Schneider
By Mauro, Cameron, Lewis & Massam
Attorneys

Nov. 6, 1923.   1,472,941
E. SCHNEIDER
ADJUSTABLE ACTION FUSE FOR PROJECTILES
Filed Jan. 4, 1922    6 Sheets-Sheet 6

Inventor:-
Eugene Schneider

Patented Nov. 6, 1923.

1,472,941

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY OF FRANCE.

ADJUSTABLE-ACTION FUSE FOR PROJECTILES.

Application filed January 4, 1922. Serial No. 526,985.

*To all whom it may concern:*

Be it known that I, EUGÈNE SCHNEIDER, a citizen of the Republic of France, resident of 42 Rue d'Anjou, Paris, France, have invented new and useful Improvements in Adjustable-Action Fuses for Projectiles, which is fully set forth in the following specification.

It has already been proposed to regulate the time at the expiration of which the mechanism of a fuse is operated by using a liquid, the flow of which takes place under the action of a spring or the pressure of the atmosphere, and also if desired, under the action of centrifugal force.

This flow which takes place at the expiration of a variable period of time assures at the expiration of said period, the freeing of the igniting mechanism and consequently allows the latter to operate.

In the known fuses based on this principal use is made of a constant quantity of liquid, and the time is varied by adjusting the cross-section of the orifice through which the flow of this liquid is to take place.

These known devices require an extremely delicate adjustment to vary the cross-section of the orifice above referred to, and when a supplementary force such as a metal or air spring is employed to aid ejection of the liquid, the fuse is necessarily complicated in construction and often uncertain in its operation.

It has already been proposed to utilize the weight of a liquid discharge under the action of centrifugal force in order to cause the said liquid to act upon one of the faces of a diaphragm or a piston at the end of a period of time varying according to the adjustment of the opposing force exerted upon the opposite face of the said diaphragm by a spring or counterweight.

In the construction last referred to the regulation, due to the varying stressing of a spring or to the varying position of a mechanical transmission comprising jointed levers, is likewise very delicate. Moreover, the action of centrifugal force has to be relied upon in order to overcome the resistance of the parts and consequently the very varying resistance of numerous forces of inertia.

The present invention now obviates all the above mentioned objectionable characteristics. In this improved fuse use is made of a liquid, the flow of which takes place solely under the action of centrifugal force, the regulation being effected by simply varying the quantity of liquid which is to flow through a capillary orifice of constant cross-section. Compared with the known fuses where liquid is used the improved fuse of the present invention possesses for this very reason the triple advantage of simplicity, exactness of regulation and certainty in operation.

Various embodiments of this invention are illustrated by way of example in the accompanying drawings in which:—

Figures 1 to 7 inclusive illustrate a first embodiment of this invention.

Figure 3 is a corresponding plan.

Figure 5 is a corresponding elevation, the parts being shown in the positions they occupy at the instant of the operation of the fuse.

Figure 6 is a horizontal section on the line 6—6 of Fig. 4.

Figure 7 is a partial plan on the line 7—7 of Figure 6.

Figure 8:
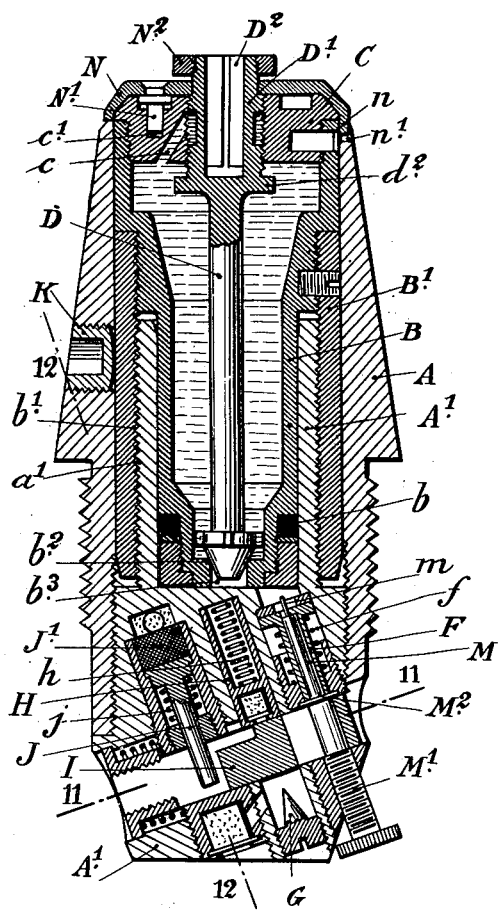
Figure 9:
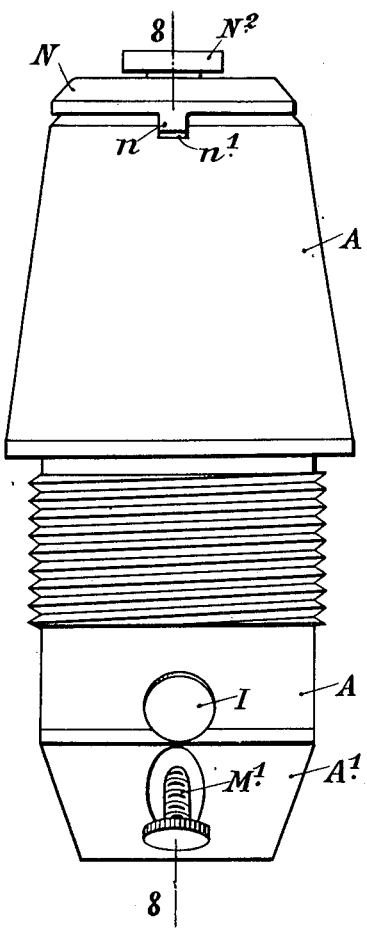
Figure 10:
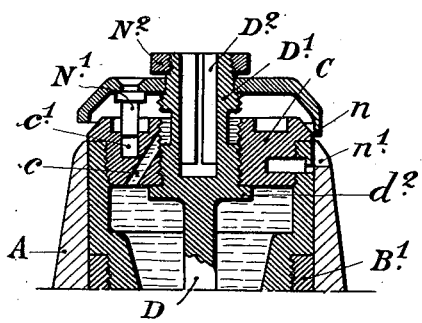
Figure 11:
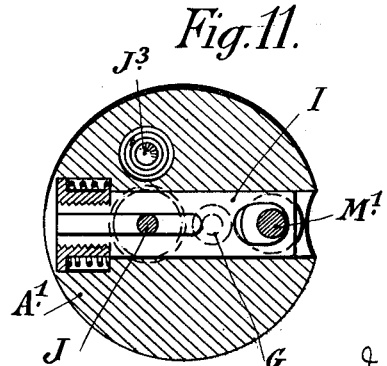
Figure 13:
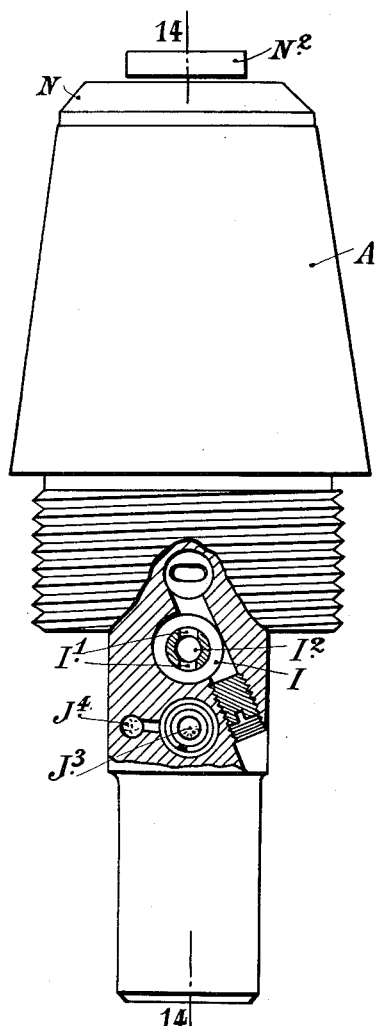
Figure 14:
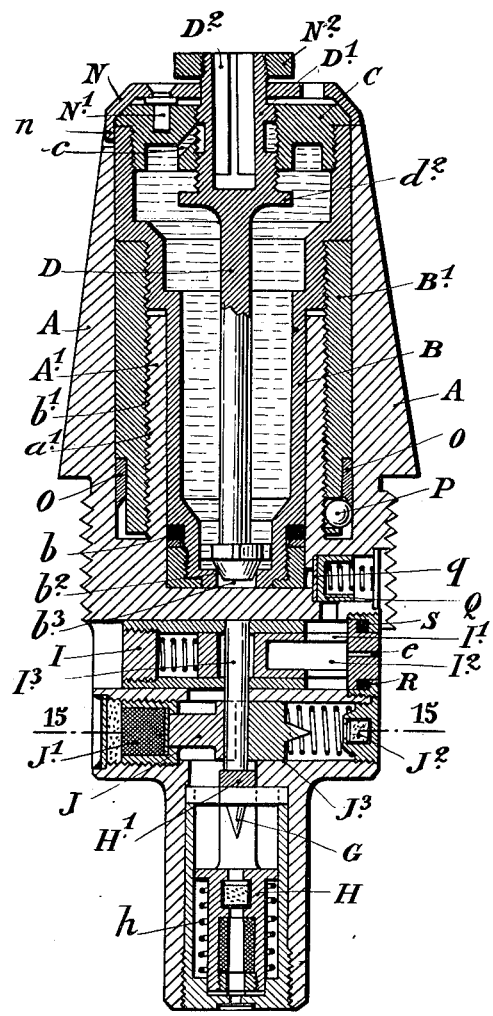
Figure 12:
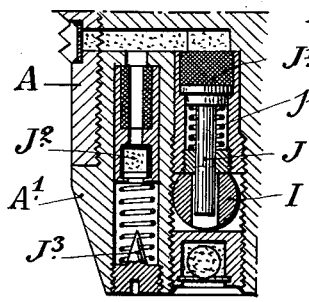
Figure 15:
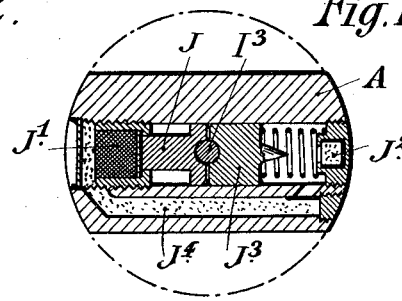
Figure 16:
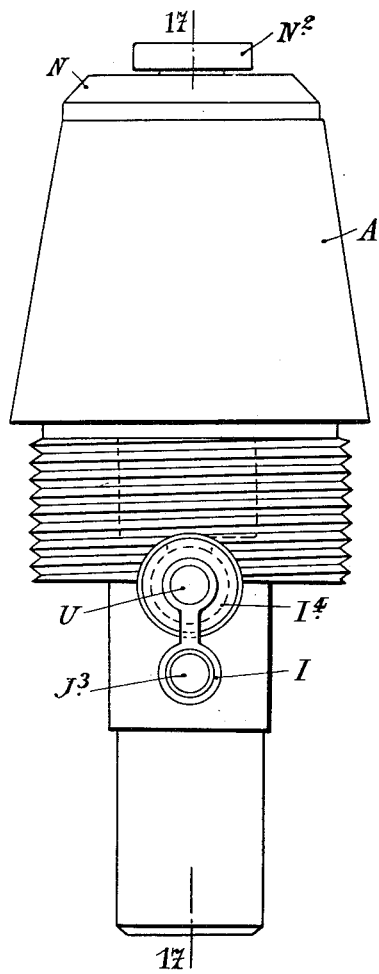
Figure 17:
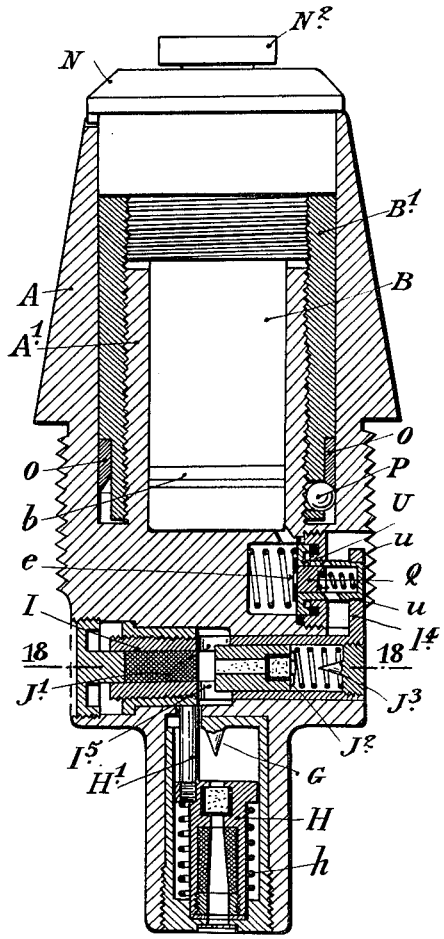
Figure 18:
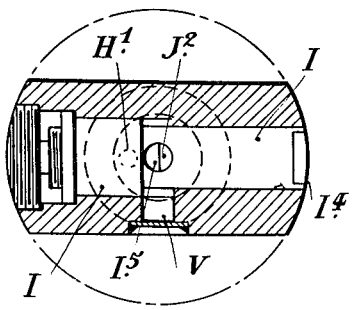

Figures 8 to 12 inclusive illustrate another embodiment of this invention. Figure 8 is a sectional elevation on the line 8—8 of Figure 9, the parts being shown in the position occupied before adjustment of the fuse;

Figure 9 is a corresponding elevation;

Figure 10 is a partial section similar to Figure 8, showing the needle valve raised for opening the reservoir;

Figure 11 is a horizontal section on the line 11—11 of Figure 8;

Figure 12 is a partial section on the line 12—12 of Figure 8;

Figures 13, 14 and 15 illustrate another embodiment of this invention respectively, in partial sectional elevation, sectional elevation on the line 14—14 of Figure 13, and horizontal section on line 15—15 of Fig. 14;

Figures 16, 17 and 18 are respectively an elevation, a vertical section on the line 17—17 of Figure 16, and a horizontal section on the line 18—18 of Figure 17, of another embodiment of this invention.

In these figures A—A' is the body of the fuse made preferably in two parts A A' assembled by means of a screw thread $a$. The element A' of the fuse body is so constructed as to be capable of forming in its upper part a receiving chamber provided by the elements for the liquid passing over from the axial chamber B—B' hereinafter called the reservoir. The element B is guided with a very slight amount of play in the inner wall of the chamber A' while the element B' screwing upon the element B is provided in its interior part with an internal screw thread by means of which it screws upon a corresponding screw thread $a'$ on the element A' of this body. The reservoir B—B' is closed by means of a plug C in the axial screw threaded hole of which there is screwed the upper screw threaded end D' of a needle valve D—D' for which a seat is formed at $b^2$ screwing into the reservoir with a tight joint $b$. This block is pierced below the seat $b^2$ with an orifice $b^3$.

Figures 1, 2:
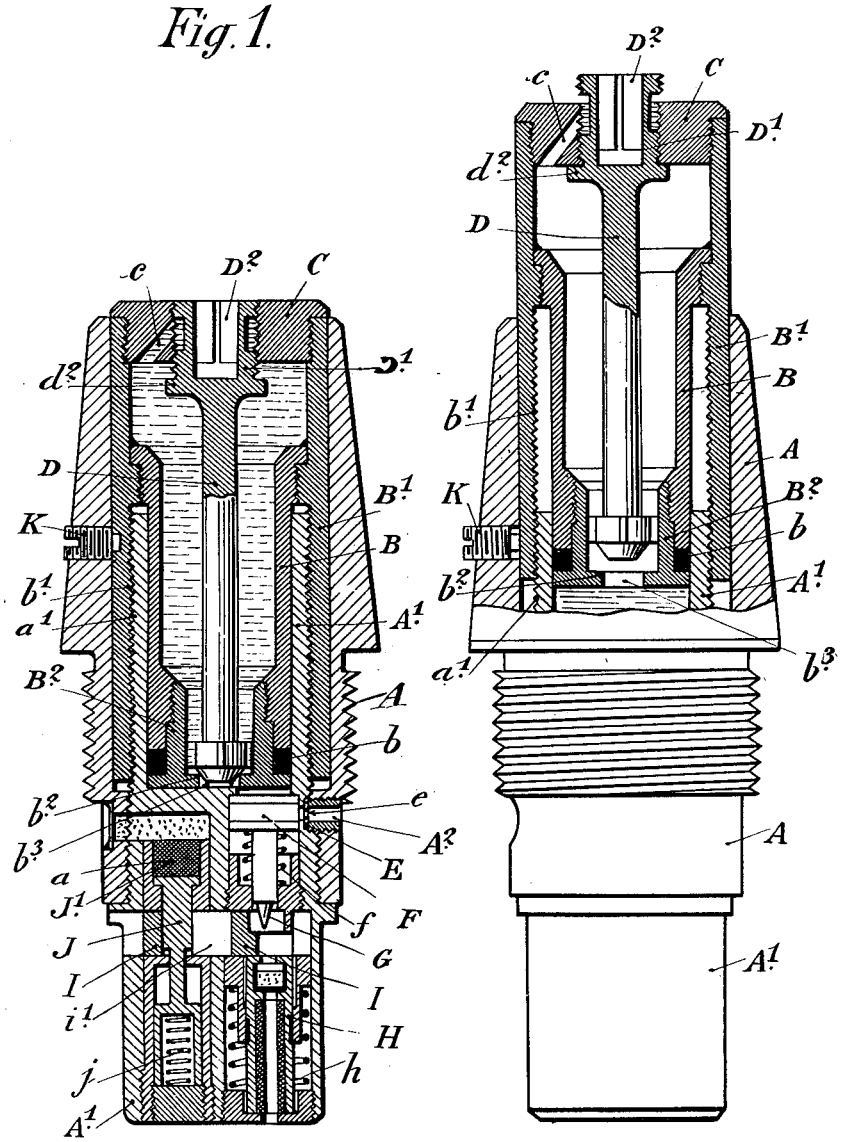
Figure 1 is a sectional elevation along the axis of the improved fuse, the parts being shown in the position of rest before adjustment.
Figure 2 is an elevation partly in section showing the fuse in the position of adjustment for the maximum time period, the needle valve being still raised so that the liquid may pass from the reservoir into the receiving chamber.
Figure 4:
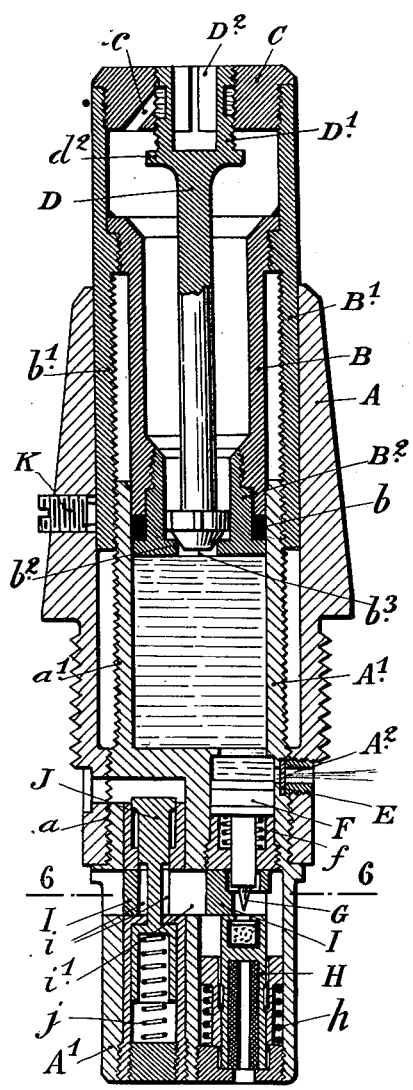
Figure 4 is a section similar to Figure 1, showing the fuse adjusted as in the case of Figure 2, the parts being represented in the positions they occupy during the flight of the projectile.

Normally, while at rest the needle valve bears upon its seat $b^2$ as shown in Figure 1; the reservoir B—B' is filled with liquid and the block B² bears with its lower end against the bottom of the chamber into which the liquid is to flow. In the wall of the element A', below the bottom of the liquid chamber, the fuse body is pierced with a flow passage or port A² in which is mounted a thin plate E pierced with a capillary escape hole $e$ of constant cross-section.

While at rest the orifice $e$ is closed by the piston F which carries at its lower end the striker G of the igniting mechanism with which there co-operates the movable plunger H carrying the detonating cap.

The piston F—G is held in the position shown in Figure 1 by a spring $f$. It is guided in a lodgment in the fuse body in such a manner that it is adapted to engage at a desired moment during the flight of the projectile, with a shoulder formed by a recess, in one end of a movable transverse barrier I interposed between the cap-carrying plunger and the striker. This barrier is slotted at the recessed end thereof to allow the same to pass the striker point when the barrier is moved outwardly by centrifugal force. Before firing the shot the barrier is further held in place by a safety locking device comprising a stem J subjected to the action of a spring $j$ which is engaged in a button-hole slot $i$ in the said barrier and is held in this position by a gunpowder pellet J' which is intended to be consumed by the flame transmitted to it by reason of the ignition of the cap J² produced by the firing of the shell, the said cap being projected on to the striker J³ (Figure 7).

For the purpose of regulation, the fuse is mounted on the projectile, the latter being placed vertically and a set screw K is unscrewed which while at rest locks in place the movable reservoir B—B'. Then a block key is introduced into a square recess D² formed in the upper end of the needle valve. By turning this key in the proper direction the needle valve is raised until a collar $d^2$ on the latter abuts against the plug C. In this manner the bottom orifice $b^3$ which allows the liquid to flow out, is open while at the same time the air is able to pass freely to the upper level of the liquid through holes $c$ in the plug C that is placed in communication with the atmosphere through a reduced portion of the needle valve. The quantity of liquid which is able to pass out from the reservoir B—B' will depend on the free height which is left in the chamber A' by a greater or less raising of the reservoir produced by continuing more or less the unscrewing operation by means of the block key until the desired division mark of the scale marked on the outer wall of the reservoir shall have come opposite a fixed mark L (Figure 5) placed on the upper bevel of the fuse body.

When the adjustment or regulation has been suitably effected (in the example shown it is assumed that this adjustment has been effected for the maximum time) the set-screw K is tightened again and the orifice $b^3$ is closed again by causing the needle valve to descend until it bears upon its seat $b^2$.

When the shell is fired the piston-shaped striker G is projected rearwardly by reason of its inertia and enters the recess in the movable barrier I. The stem of the striker then engages the shoulder formed by the said recess and prevents displacement of the barrier by the action of centrifugal force. So long as the liquid which is flowing over into the chamber A' is exerting pressure by reason of its inertia upon the piston-shaped striker the latter will remain in its locked position and will thus maintain the transverse barrier I in place which in its turn constitutes a stop for arresting the percussion-cap block H.

As soon as the projectile begins to move the striking mechanism for igniting the gun powder pellet J' operates, the cap J² being moved rearwardly by inertia and being ignited by the striker J³.

When the gunpowder pellet J' has been consumed which takes place only at a suitable distance from the muzzle of the gun the stem J becomes free and is driven forward by the spring $j$; the barrier I is then cocked, the small diameter of the stem J having come opposite the slot $i'$ in the said locking member.

When all the liquid contained in the chamber $A'$ has escaped by reason of the action of centrifugal force through the aperture $e$ the piston-shaped striker F—G being no longer subjected to this force, the spring $f$ will raise it into its initial position (Figures 1 and 5), thus allowing the movable transverse barrier I to move to the left and release the cap carrying plunger H which is then driven forwards by the spring $h$ and this causes ignition of the percussion cap (Figure 5). The flame is then transmitted in the known manner directly through the intermediary of a detonator.

In the embodiments shown in Figures 8 to 12 the member F for holding in place the transverse barrier I is not positively connected to one of the parts of the igniting mechanism. The said member F is movable in a lodgment that is inclined relatively to the axis of the fuse for the purpose of producing an increase in the pressure of the liquid acting upon its upper face. The capillary orifice for the outflow of the liquid is pierced in the head of this member and is closed in the rest position by a pointed end $m$ of the short rod M engaged in a central recess in the member F. A screw $M'$, which is removed at the time of fitting the fuse in the projectile, maintains this rod M in place through the medium of a washer $M^2$.

The transverse barrier I whose lodgment is at right angles to that of the member F maintains the cap carrying plunger H in place up to the time of the operation of the fuse. In the position of rest the rod J holds also the bolt which it releases only after combustion, on the firing of the shot of the gunpowder pellet $J'$ that has been ignited as a consequence of the operation of the striker mechanism $J^2$—$J^3$. Before the adjustment of the fuse, that is to say, before it has been fitted into the projectile the screw $M'$ which assured the retention of the rod M during transport is withdrawn; the pointed end $m$ of said rod which has been engaged in the capillary hole having further prevented any obstruction of said hole by dirt or other material.

In order to prevent any accidental unscrewing of the reservoir B—$B'$ during the raising of the needle valve D—$D'$ for opening the orifice of the said reservoir, there may be arranged as shown in the figure around the upper end of the needle valve a cap N engaged by a nib $n$ of the same height as the travel of the screw, inside the reservoir in a notch $n'$ of corresponding depth formed in the fuse body A and retained on the other hand by a finger $N'$ in a recess $c'$ in the plug C. A nut $N^2$ prevents any rising of the cap relatively to the needle valve. During the raising of the needle valve D—$D'$ in the plug C the latter is held fast by the fact of the cap N being held at the same time in the notch $n'$ and in the lodgment $c$. During this unscrewing movement the needle valve turns in the cap N which simply rises with it without its turning until after the cap has become disengaged from $n'$ and $c'$ which occurs when the needle valve bears with its collar $d^2$ against the bottom of the plug (Figure 10) can the said block and the reservoir B—$B'$ be unscrewed together to allow of the transference of liquid. In this manner certainty is afforded that the orifice closed by the needle valve has been opened. The operation is quite similar to that of the fuse just hereinbefore described.

On the firing of the shell the striker mechanism for igniting the gunpowder pellet $J'$ is operated. When the pellet $J'$ has been consumed the rod J is raised by its spring $j$ and it releases the barrier I which is however still held during the entire duration of the discharge of the liquid by the piston F which from the very beginning of the movement of the striker has forced away the washer $M^2$, thus allowing the pointed rod M—$m$ to be ejected. When the whole of the liquid has passed out the pressure upon the piston F ceases and the latter rises under the action of the spring $f$ thus releasing finally the barrier I. This member I, being then moved back by the action of centrifugal force frees the cap carrying plunger H—$h$ which is then impelled against the fixed striker G.

In the embodiment shown in Figures 13 to 15 all the movable parts are so arranged as to be capable of moving along the axis or radii of the face (Figure 15).

The liquid reservoir and the receiving chamber into which the liquid is transferred are arranged as in the foregoing examples. In the present example however, the screw K serving to hold the reservoir in position after the adjustment is replaced by an automatic locking device. This device consists of a ring O arranged around the reduced end of the element $B'$ of the reservoir and bears upon balls P retained between the elements A—$A'$ of the fuse body in holes formed in the lower ends of the elements $B'$ of the reservoir. The balls may be for instance, three in number. On the firing of the shell the ring O remains behind owing to its inertia and presses the balls P firmly against the screw thread of the element $A'$ of the fuse body.

An independent closing member Q which is movable in a transverse lodgment closes up to the firing of the shot a communication orifice $q$ between the chamber $A'$ containing the transferred liquid and the capillary outflow orifice e. This closing member being acted upon by a counter spring prevents any loss of liquid when the fuse has been adjusted up to the moment of firing. The igniting mechanism which comprises movable cap carrying plunger H—h and the stationary striker G is arranged in the axis of the fuse. The engaging member of this mechanism that is to say, the fixing member of the stirrup H' of the block, is constituted solely by the transverse barrier I. This barrier I is pierced in one end with the outflow orifice e and it bears at this end through the medium of a joint packing R against a plug S. The liquid is able to reach the orifice e through two slits I' and the central hole I² to the capillary orifice e. The barrier carries the rod I³ which, up to the complete discharge of the transferred liquid, will constitute an abutment with its lower end for the stirrup H'-of the cap carrying plunger. To facilitate the construction the barrier I is made in two parts, namely the piston containing the capillary outflow orifice e and a ring surrounding said piston. These two parts are assembled together by the rod I³.

The barrier is subjected during the operation to the action of centrifugal force of the liquid which tends to drive it to the right; this force may be represented by T. The centrifugal force T' of one portion of its mass tends also to drive it towards that side and to press it against the packing R; the centrifugal force T'' of another portion of its mass tends to drive it in the opposite direction. The masses of the barrier are made such that T''-T' and T''+T'-T.

The improved fuse process has in the foregoing examples a striker mechanism composed of a fixed percussion cap holder J² and a movable striker J³ which operates on the firing of the shell and ignites the gunpowder pellet J' by means of the fuse composition J⁴, thus allowing of the ejection of the rod J which up to that moment has been bearing against and thereby locking the retaining member I³.

The liquid, by the action of centrifugal force, drives the closing member outwardly and passes through the slits I' and the holes I² to the capillary outflow orifice e. So long as the liquid remains in the chamber A' the barrier will remain pressed against the packing R but immediately the liquid has ben entirely discharged the force T'' overcomes the force T' and thus acts solely in one direction, so that the barrier is driven to the left carrying with it the rod I³ and thus releasing the cap carrying plunger. Since the piston J³ remains pressed against the percussion cap holder J² by the action of the centrifugal force the igniting mechanism can operate properly.

In the embodiment shown in Figures 16 to 18, the transverse barrier I serves as a lodgment for the striker mechanism composed of a fixed striker J³ and the movable percussion cap holder J²; this mechanism thus constitutes a part of the mass of the barrier. At its right-hand end the barrier is provided with a projecting bracket I⁴ in which there is engaged and supported a piston U pierced with orifices u through which the liquid is discharged after it has passed through the capillary hole e provided in a plate fixed to the fore part of the said piston. Against this plate there bears normally a closing member Q which prevents any loss of liquid in the adjusted fuse while awaiting the firing. The igniting mechanism is arranged as in the foregoing example in the axis of the fuse and at the bottom of the latter; it comprises a fixed striker G and a movable cap carrying plunger H—h which is provided with a rod H' that is locked in position up to the time of its operation by the barrier I.

On the shell beng fired the striking mechanism in operating by the movement of the cap holder J² by reason of the action of said centrifugal force, effects the ignition of the gunpowder pellet J' which is rammed directly in the barrier and holds the latter in position while at rest. From this moment onwards the barrier I is held only by the thrust of the closing member U by the action of the centrifugal force of the liquid escaping through the capillary orifice and the holes u and uncovered by the closing member U. The masses of the barrier I are made as in the foregoing example such that the effort T due to the centrifugal force acting upon the portion of the mass situated to the right of the axis of the fuse, Figure 17, aided by the effort T due to the centrifugal force of the liquid escaping towards the same side overcomes the effort T'' which is exerted in the opposite direction upon the portion of the mass of the barrier situated to the left of the axis. Immediately the action of the additional centrifugal force due to the liquid ceases to be exerted the barrier will move towards the left and will release the cap carrying plunger H—H' which is then impelled by its spring against the striker G.

It is to be understood that the barrier I is pierced with a passage I⁵ for the rod H' opposite which the said hole then comes. V (Figure 18) is a passage for the escape of the gases.

Having now particularly described and ascertained the nature of my said invention and in what manner the same is to be performed, I declare that what I claim is:—

1. In a shell fuse, a cap-carrying plunger, a striker and a barrier interposed between said plunger and striker, means normally locking said barrier against centrifugal action, a burning composition ignited upon firing of the shell and normally holding said locking means in locking position, a liquid receiving chamber provided with a port leading to the atmosphere, means for supplying a predetermined amount of liquid thereto, port-closing means subjected to the inertia of the liquid in said chamber when the shell is fired and acting to shift the striker into locking engagement with said barrier, and means shifting the striker out of engagement with said barrier when the liquid is exhausted from said chamber.

2. In a shell fuse, a cap-bearing plunger, a piston having a striker point, a radially movable barrier interposed between said plunger and point, a liquid receiving chamber provided with a port leading to the atmosphere and normally closed by said piston, means for supplying a predetermined amount of liquid to said chamber, means normally locking said barrier against radial movement until after the shell is fired, a shoulder on said barrier engaged by said piston when the latter is moved by inertia on firing the shell to open said port, and means shifting said piston out of engagement with said barrier when the liquid is exhausted from said chamber.

3. In a time fuse, the combination of a cap-bearing plunger and a striker, with a safety barrier normally interposed between said plunger and striker, a locking device holding said barrier in safety position until the shell is fired, and timing means engaging said barrier on firing the shell and retaining the same in safety position for a predetermined time after the shell leaves the muzzle of the gun.

4. In a shell fuse, a cap-bearing plunger, a piston having a striker point, a radially movable barrier interposed between said plunger and point, a chamber provided with a port leading to the atmosphere and normally closed by said piston, a liquid-receiving reservoir telescoping with said chamber and provided with a port leading thereto, means for controlling said port, means normally locking said barrier against radial movement until after the shell is fired, a shoulder on said barrier engaged by said piston when the latter is moved by inertia on firing the shell to open said port, and means shifting said piston out of engagement with said barrier when the liquid is exhausted from said chamber.

5. In a shell fuse, a cap-bearing plunger, a striker, a radially movable barrier interposed between said plunger and striker, a liquid-receiving chamber provided with a port leading to the atmosphere, a piston operatively connected to said striker and exposed to the inertia of the liquid in said chamber and controlling said port, means normally locking said barrier against radial movement until after the shell is fired, a shoulder on said barrier engaged by the striker when the latter is moved by inertia upon firing the shell, and means shifting said piston out of engagement with said barrier when the liquid is exhausted from said chamber.

6. In a shell fuse, a cap-bearing plunger, a striker, a radially movable barrier interposed between said plunger and striker, means normally locking said barrier against radial movement, a combustible compound normally holding said locking means in locking position, means for igniting said compound when the shell is fired, a liquid-receiving chamber provided with a port leading to the atmosphere, a piston in operative relation with said striker and normally closing said port, means for supplying a predetermined amount of liquid to said chamber, a shoulder on said barrier engaged by said striker when the latter is moved by inertia of the liquid in said chamber on firing the shell to open said port, and means shifting said piston out of engagement with said barrier when the liquid is exhausted from said chamber.

7. In a shell fuse, a chamber having a port leading to the atmosphere, a liquid-receiving reservoir telescoping therewith and having a port communicating with said chamber, means controlling the latter port, a cap-bearing plunger, a striker, a barrier between the plunger and striker, means exposed to the inertia of the liquid in said chamber for controlling said port and operatively connected to said striker, said striker operating to retain said barrier interposed between itself and the cap-bearing plunger while said port is open, and means simultaneously shifting the striker and port-controlling means into position to close said port and free said barrier when the liquid is exhausted from said chamber.

8. In a shell fuse, a cap-bearing plunger, a striker, a barrier engaged by said striker to hold said barrier interposed between the plunger and striker after the shell leaves the muzzle of the gun, and timing means controlling the movement of said striker to free said barrier during the flight of the shell.

9. In a shell fuse, a fuse casing having an axial chamber and provided with a port leading to the atmosphere, a liquid-receiving reservoir telescoping in said chamber and provided with a port communicating therewith, means for controlling said port, means for producing longitudinal movement of said reservoir relative to said chamber, means for locking said reservoir in adjusted position, a cap-bearing plunger, a striker, a barrier interposed therebetween and engaged by said striker to prevent movement thereof, means exposed to the inertia of the liquid in said chamber and controlling the port thereof, said port-controlling means being operatively connected to the striker, and means shifting the striker out of engagement with said barrier when the liquid is exhaused from said chamber.

10. In a shell fuse, a cap-bearing plunger, a striker, a barrier normally interposed between said plunger and striker, means normally locking said carrier against radial movement but releasing the same when the shell is fired, and timing mechanism operatively connected to said striker and holding the latter in engagement with the barrier to prevent movement thereof until a predetermined time after the shell leaves the muzzle of the gun.

11. In a liquid-controlled time fuse, the combination of a liquid-receiving chamber provided with a port to the atmosphere, and a liquid reservoir provided with a port leading to said chamber, said reservoir and chamber telescoping one within the other, means controlling said communicating port, and means operatively connected to the striker and controlling said atmosphere port.

12. In a time fuse, the combination of a cap-bearing plunger, a striker, a barrier between said plunger and striker engaged by the latter when firing the shell, adjustable timing mechanism holding the striker in engagement with said barrier for a predetermined time, and means for shifting said striker out of engagement with said barrier.

13. In a shell fuse, a cap-carrying plunger and a striker, means normally holding said plunger in retracted position, means normally locking said plunger holding means but unlocked when the shell is fired, and timing mechanism engaging said plunger holding means but releasing the same at a predetermined time after the shell leaves the muzzle of the gun.

14. In a shell fuse, the combination of a liquid receiving chamber provided with a discharge port and a liquid reservoir provided with a port leading to said chamber, means controlling the communicating port, means normally closing the discharge port but opened when the shell is fired, a cap-bearing plunger, a striker, and means subjected to the inertia of the liquid for holding said plunger in retracted position a predetermined time after the shell is fired.

15. In a shell fuse, the combination of a liquid receiving chamber provided with a discharge port and a liquid reservoir provided with a port leading to said chamber, said reservoir and chamber telescoping one within the other, means controlling the communicating port, means normally closing the discharge port but opened when the shell is fired, means for producing longitudinal movement of said reservoir relative to said chamber, means for locking the reservoir in any desired position, a cap-bearing plunger, a striker, and means subjected to the inertia of the liquid for holding said plunger in retracted position a predetermined time after the shell is fired.

Dated this 14th day of November, 1921.

In testimony whereof I have signed this specification.

EUGÈNE SCHNEIDER.

Witnesses:
ANDRÉ MOSTICKER,
LOUIS GARDET.